United States Patent
Novoselov et al.

(10) Patent No.: US 9,953,589 B2
(45) Date of Patent: Apr. 24, 2018

(54) RESET DRIVE VOLTAGE TO ENHANCE GREY SCALE RESOLUTION FOR AN ELECTROWETTING DISPLAY DEVICE

(71) Applicant: Amazon Technologies, Inc., Seattle, WA (US)

(72) Inventors: Pavel Novoselov, Eindhoven (NL); Steven Ramos Carneiro, Eindhoven (NL); Henricus Petronella Maria Derckx, Weert (NL); Tulasi Sridhar Reddy Guntaka, Eindhoven (NL)

(73) Assignee: AMAZON TECHNOLOGIES, INC, Seattle, WA (US)

( * ) Notice: Subject to any disclaimer, the term of this patent is extended or adjusted under 35 U.S.C. 154(b) by 71 days.

(21) Appl. No.: 14/788,528

(22) Filed: Jun. 30, 2015

(65) Prior Publication Data
US 2017/0004779 A1    Jan. 5, 2017

(51) Int. Cl.
*G09G 3/34* (2006.01)
*G02B 26/00* (2006.01)
*G09G 3/20* (2006.01)

(52) U.S. Cl.
CPC .......... *G09G 3/348* (2013.01); *G02B 26/005* (2013.01); *G09G 3/2007* (2013.01); *G02B 2207/115* (2013.01); *G09G 2300/0809* (2013.01); *G09G 2310/027* (2013.01); *G09G 2310/0262* (2013.01); *G09G 2310/061* (2013.01); *G09G 2310/065* (2013.01); *G09G 2320/02* (2013.01); *G09G 2320/0223* (2013.01)

(58) Field of Classification Search
CPC ...... G09G 3/348; G09G 3/344; G09G 3/3433; G09G 2300/0439; G09G 2310/061; G02B 26/005; G02B 26/004; G02B 2207/115; G02F 2001/1635
See application file for complete search history.

(56) References Cited

U.S. PATENT DOCUMENTS

| | | | | |
|---|---|---|---|---|
| 7,952,557 B2* | 5/2011 | Amundson | ............ | G09G 3/344 345/107 |
| 9,001,027 B2* | 4/2015 | Choi | ............... | G09G 3/348 345/107 |
| 9,530,363 B2* | 12/2016 | Ben-Dov | ............... | G09G 3/344 |

(Continued)

FOREIGN PATENT DOCUMENTS

WO    WO2008119774    10/2008

OTHER PUBLICATIONS

The PCT Search Report and Written Opinion dated Sep. 7, 2016 for PCT application No. PCT/US2016/039311, 10 pages.

*Primary Examiner* — Sanjiv D Patel
(74) *Attorney, Agent, or Firm* — EIP US LLP (57) ABSTRACT

An electrowetting display device may comprise pixels that include: a hydrophobic layer portion disposed on a first electrode, electrowetting fluids overlying the hydrophobic layer portion, and a thin film transistor (TFT) that is in electrical contact with the first electrode. The electrowetting display device also comprises a display control circuit in electrical contact with a drain or a source of the TFT of each of the pixels to provide a drive voltage to the drain or the source of the TFT of each of the pixels, and a reset control circuit in electrical contact with the drain or the source of the TFT of each of the pixels to provide a reset voltage pulse to the drain or the source of the TFT of each of the pixels. A magnitude of the reset voltage pulse may be based, at least in part, on the drive voltage.

19 Claims, 5 Drawing Sheets

(56) References Cited

U.S. PATENT DOCUMENTS

| | | | | |
|---|---|---|---|---|
| 2006/0119567 A1* | 6/2006 | Zhou | ................ | G09G 3/344 345/107 |
| 2007/0035510 A1* | 2/2007 | Zhou | ................ | G09G 3/344 345/107 |
| 2007/0075941 A1* | 4/2007 | Zhou | ................ | G02B 26/005 345/84 |
| 2007/0103427 A1* | 5/2007 | Zhou | ................ | G09G 3/344 345/107 |
| 2007/0176889 A1* | 8/2007 | Zhou | ................ | G09G 3/2011 345/107 |
| 2010/0231566 A1* | 9/2010 | Feenstra | ............ | G02B 26/005 345/211 |
| 2011/0025668 A1* | 2/2011 | Huitema | ............ | G09G 3/348 345/211 |
| 2012/0154886 A1* | 6/2012 | Heikenfeld | ......... | G02B 26/004 359/228 |
| 2013/0106821 A1* | 5/2013 | Aubert | ............ | G09G 3/3433 345/211 |
| 2013/0113842 A1 | 5/2013 | Hwang et al. | | |
| 2013/0127817 A1* | 5/2013 | Hwang | ............ | G09G 3/001 345/212 |
| 2013/0257914 A1* | 10/2013 | Jung | ................ | G09G 3/348 345/690 |
| 2014/0078035 A1* | 3/2014 | Sato | ................ | G09G 3/344 345/107 |
| 2014/0139507 A1 | 5/2014 | Jung et al. | | |
| 2014/0300594 A1* | 10/2014 | Aubert | ............ | G09G 3/348 345/212 |

* cited by examiner

RESET DRIVE VOLTAGE TO ENHANCE GREY SCALE RESOLUTION FOR AN ELECTROWETTING DISPLAY DEVICE

BACKGROUND

Electronic displays are found in numerous types of electronic devices such as electronic book ("eBook") readers, cellular telephones, smart phones, portable media players, tablet computers, wearable computers, laptop computers, netbooks, desktop computers, televisions, appliances, home electronics, automotive electronics, augmented reality devices, and so forth. Electronic displays may present various types of information, such as user interfaces, device operational status, digital content items, and the like, depending on the kind and purpose of the associated device. The appearance and quality of a display may affect a user's experience with the electronic device and the content presented thereon. Accordingly, finding ways to enhance user experience and satisfaction continues to be a priority. Moreover, increased multimedia use imposes high demands on designs, packaging, and fabricating display devices, as content available for mobile use becomes more extensive and device portability continues to be a high priority.

An electrowetting display includes an array of pixels individually bordered by pixel walls that retain liquid, such as opaque oil, for example. Light throughput through each pixel is adjustable by electronically controlling a position of the liquid in the pixel. Resolution and optical performance of an electrowetting display may depend on a number of factors, such as optical transmissivity or reflectivity of material layers of the electrowetting display and pixel size, just to name a few examples.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

In various embodiments described herein, electronic devices include electrowetting displays for presenting content and other information. In some examples, the electronic devices may include one or more components associated with the electrowetting display, such as a touch sensor component layered atop the electrowetting display for detecting touch inputs, a front light or back light component for lighting the electrowetting display, and/or a cover layer component, which may include antiglare properties, antireflective properties, anti-fingerprint properties, anti-cracking properties, and the like. Various embodiments described herein include techniques for operating electronic devices including these components for the electrowetting displays and other features described herein.

In some embodiments, an electrowetting display device includes a first support plate and a second support plate and a plurality of pixel regions therebetween. Herein, unless otherwise indicated, a viewing side of an electrowetting display is not limited to the side of the display that includes either the first support plate or the second support plate. Individual pixel regions may include one or more hydrophobic layers or surfaces on the first support plate, a first fluid, and a second fluid at least partially surrounding the first fluid. For example, the first fluid may be an oil and the second fluid may be an electrolyte solution. A hydrophobic layer may comprise a hydrophobic amorphous fluoropolymer (AF1600®), for example. Herein, the term "hydrophobic" is used to describe a material or layer that is hydrophobic relative to other materials or layers. For example, a hydrophobic layer need not be 100% hydrophobic, though the hydrophobicity of the layer may be relatively high. Hydrophobicity of a "hydrophobic material" or "hydrophobic layer" may change under various circumstances or conditions. While each pixel region may include a first electrode (e.g., pixel electrode) disposed on the first plate, a second electrode, which may (or may not) be disposed on the second support plate, may overlay a plurality of the pixel regions. Herein, "disposed on" includes the possibility of intermediate layers (e.g., "disposed on" need not mean "directly on").

The electrowetting display device may also include a control circuit to provide a reset pulse to the plurality of pixel regions, hereinafter referred to as "pixels", connected to the second electrode layer. The control circuit may adjust the amplitude of such a reset pulse to modify—driving characteristics of the pixels. Such adjusting may be based, at least in part, on a desired grey scale value, corresponding to a particular reflectance (or transmittance) of an individual pixel. In this fashion, the control circuit may drive the pixels to any of a number of grey scales, as described in detail below.

Generally, a reset pulse may be applied to the electrowetting pixels to reduce adverse effects on the quality (e.g., brightness, contrast ratio, and so on) of an image displayed by the pixels resulting from electrowetting fluid backflow. For example, such backflow can reduce the stability of a display state during a display period which, for example, is the period during which a desired first display state is to be maintained. Here, the first display state corresponds to a first fluid (e.g., electrowetting oil) being contracted or partially contracted to allow light to transmit through (or reflect from)

the electrowetting pixel. Even though a first signal level corresponding to the first display state is applied to the electrowetting element during this period, the contracted or partially contracted first fluid tends to flow back to form a layer over the bottom electrode layer of the pixel, as in the case of an inactive state that prevents light from transmitting through (or reflecting from) the electrowetting pixel. The rate of backflow depends, at least in part, on the properties of the first fluid. Backflow leads to an undesirable change in the display state of the electrowetting pixel and, consequently, a reduced quality of the image of the display device.

The application of a reset pulse during the display period of the first display state resets the electrowetting pixel to counteract backflow. Since the reset pulse may affect the instantaneous display state of an electrowetting pixel, the duration of the reset pulse is relatively short compared to the duration of the first signal level corresponding to the first display state. For example, the reset pulse may have a duration short enough so as to not be noticeable to a viewer of the display device. For a particular example, the duration of a reset pulse may be about 1 millisecond with a duty cycle of about 5%, though claimed subject matter is not so limited.

In a number of embodiments, a display device, such as an electrowetting display device, may be a transmissive, reflective or transflective display that generally includes an array of pixels (e.g., or subpixels) configured to be operated by an active matrix addressing scheme. For example, rows and columns of electrowetting elements are operated by controlling voltage levels on a plurality of data lines and gate lines. In this fashion, the display device may produce an image by selecting particular pixels to transmit, reflect or block light. Pixels may be addressed (e.g., selected) via rows and columns of the data lines and gate lines that are electrically connected to transistors (e.g., used as switches) included in each pixel. Transistors take up a relatively small fraction of the area of each pixel to allow light to efficiently pass through (or reflect from) the pixel. For example, the transistor may be located underneath the reflector in reflective displays. Herein, a pixel (e.g., pixel region) may, unless otherwise specified, comprise a single subpixel or a pixel that includes two or more subpixels of an electrowetting display device. Such a pixel or subpixel may be the smallest light transmissive, reflective or transflective element of a display that is individually operable to directly control an amount of light transmission through and/or reflection from the element. For example, in some implementations, a pixel may be a pixel that includes a red subpixel, a green subpixel, a blue subpixel, and a white pixel (e.g., as in a PenTile® layout). In other implementations, a pixel may be a pixel that is a smallest component, e.g., the pixel does not include any subpixels.

Electrowetting displays include an array of pixels comprising pixels and/or subpixels sandwiched between two support plates, such as a substrate and a top plate. For example, the substrate may be a first support plate that, in cooperation with the top plate (the second support plate), contains pixels that include oil, electrolyte solution, and pixel walls between the support plates. Support plates may include glass, plastic (e.g., a transparent thermoplastic such as PMMA or other acrylic), metal, semiconductor material, or other material and may be made of a rigid or flexible material, for example.

Pixels include various layers of materials built upon a first support plate. One such layer may be a hydrophobic layer like a fluoropolymer (e.g., Teflon® AF1600®).

Hereinafter, example embodiments describe reflective electrowetting displays comprising an array of pixels sandwiched between a first support plate and a second support plate. The first support plate may be opaque while the second support plate may be transparent. Herein, describing an element or material as being "transparent" means that the element or material may transmit a relatively large fraction of the light incident upon it. For example, a transparent substrate or layer may transmit more than 70% or 80% of the light impinging on its surface, though claimed subject matter is not limited in this respect.

The transparent second support plate may comprise glass or any of a number of transparent materials, such as plastic, quartz, semiconductors, and so on, though claimed subject matter is not limited in this respect. Also, as used herein for sake of convenience of describing example embodiments, the second support plate is that through which viewing of pixels of a (reflective) electrowetting display occurs. In other embodiments, such orientations and positioning of support plates and other elements of an electrowetting display may be at least partially reversed, such as in the case for a transmissive electrowetting display. Claimed subject matter is not limited in this respect.

Pixel walls retain at least a first fluid which may be electrically non-conductive and/or non-polar, such as opaque or colored oil, in the individual pixels. A cavity formed between the support plates is filled with the first fluid (e.g., the first fluid being retained by pixel walls) and a second fluid (e.g., considered to be an electrolyte solution) that is polar and may or may not be electrically conductive, and may be a water solution, such as a mixture of water and ethyl alcohol, or a salt solution, such as a solution of potassium chloride in water. The second fluid may be transparent, but may be colored, or light-absorbing. The second fluid is at least partially immiscible with the first fluid.

In some embodiments, individual reflective electrowetting pixels may include a reflective layer on the first support plate of the electrowetting pixel, a transparent electrode layer adjacent to the reflective layer, and a hydrophobic layer disposed on the electrode layer. In some implementations, an electrode layer may act as a reflective layer. Herein, 'disposed on' includes the possibility of intermediate layers. Pixel walls of each pixel, the hydrophobic layer, and the transparent second support plate at least partially enclose a liquid region that includes an electrolyte solution and a light-absorbing or opaque liquid, which is immiscible with the electrolyte solution. An "opaque" liquid, as described herein, is used to describe a liquid that appears black or colored to an observer. For example, a black opaque liquid strongly absorbs a broad spectrum of wavelengths (e.g., including those of red, green and blue) in the visible region of electromagnetic radiation. In some implementations, the opaque liquid is a nonpolar oil.

The opaque liquid is disposed in the liquid region. As described in detail below, coverage area of the opaque liquid on the bottom hydrophobic layer is electronically adjustable to affect the amount of light incident on the reflective electrowetting display that reaches the reflective material at the bottom of each pixel.

A spacer grid and edge seals which mechanically connect a first support plate with a second overlying support plate, or which form a separation between the first support plate and the second support plate, contribute to the mechanical integrity of the electrowetting display. Edge seals, for example, being disposed along a periphery of an array of electrowetting display device pixels, may contribute to retaining (e.g., first and second) fluids between the first support plate and the second overlying support plate.

In some embodiments, a display device as described herein may comprise a portion of a system that includes one or more processors and one or more computer memories, which may reside on a control board, for example. Display software may be stored on the one or more memories and may be operable with the one or more processors to modulate light that is received from an outside source (e.g., ambient light) or out-coupled from a light guide of the display device. For example, display software may include code executable by a processor to modulate optical properties of individual pixels of the electrowetting display based, at least in part, on electronic signals representative of image or video data. The code may cause the processor to modulate the optical properties of pixels by controlling electrical signals (e.g., voltages, currents, fields, and so on) on, over, or in layers of the electrowetting display.

Figure 1:
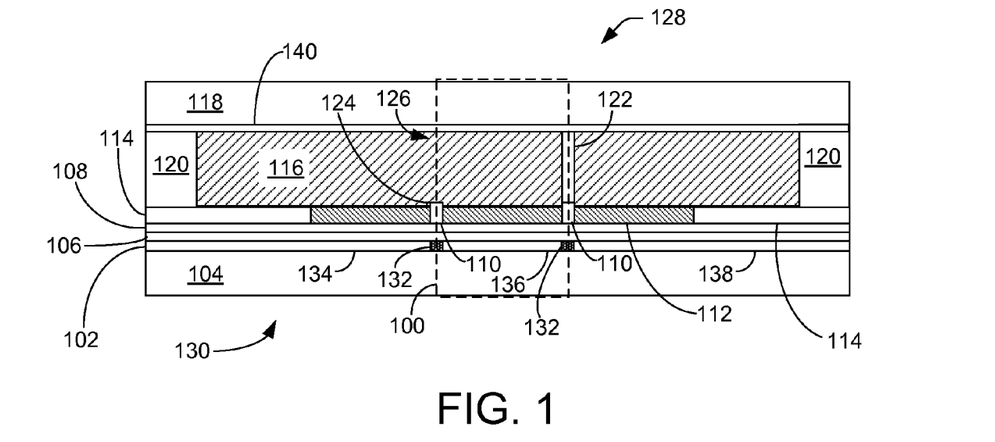
FIG. 1 illustrates a cross-section of a portion of an electrowetting display device, according to some embodiments.

FIG. 1 is a cross-section of a portion of a reflective electrowetting display device illustrating several electrowetting pixels 100, according to some embodiments. Though three such electrowetting pixels are illustrated, an electrowetting display device may include any number (usually a very large number, such as thousands or millions) of electrowetting pixels. An electrode layer 102 is formed on a first support plate 104 and may comprise one or more individual electrodes in each electrowetting pixel.

In various embodiments, electrode layer 102 may be connected to any number of thin film transistors (TFTs) (not illustrated) that are switched to either select or deselect electrowetting pixels 100 using active matrix addressing, for example. A TFT is a particular type of field-effect transistor that includes thin films of an active semiconductor layer as well as a dielectric layer and metallic contacts over or on a supporting (but non-conducting) substrate, which may be glass or any of a number of other transparent or non-transparent materials, for example.

In some implementations, a barrier layer 106 may at least partially separate electrode layer 102 from a hydrophobic layer 108 also formed on first support plate 104. In some implementations, hydrophobic layer 108 may comprise any of a number of types of fluoropolymers, such as AF1600®, produced by DuPont, based in Wilmington, Del. Hydrophobic layer 108 may also be any of a number of water-repelling materials that affect wettability of an adjacent material, for example.

Pixel walls 110 form a patterned electrowetting pixel grid on hydrophobic layer 108. Pixel walls 110 may comprise a photoresist material such as, for example, epoxy-based negative photoresist SU-8. The patterned electrowetting pixel grid comprises rows and columns that form an array of electrowetting pixels. For example, an electrowetting pixel may have a width and length in a range of about 50 to 500 microns. In some implementations, the pixel walls need not be on the hydrophobic layer. For example, pixel walls may be directly on the electrode layer (not illustrated in FIG. 1).

A first fluid 112, which may have a thickness (e.g., depth, height) in a range of about 1 to 10 microns, for example, overlies hydrophobic layer 108. First fluid 112 is partitioned by pixel walls 110 of the patterned electrowetting pixel grid. An outer rim 114 may comprise the same material as pixel walls 110. A second fluid 116, such as an electrolyte solution, overlies first fluid 112 and pixel walls 110 of the patterned electrowetting pixel grid. First fluid 112 is at least partially immiscible with second fluid 116 so that the first fluid and the second fluid do not substantially mix with each other, and in some examples do not mix with each other to any degree. Herein, substances are immiscible with one another if the substances do not substantially form a solution. Second fluid 116 is preferably transparent, but may be colored or absorbing. First fluid 112 is non-polar and may for instance be an alkane like hexadecane or (silicone) oil.

A second support plate 118 covers second fluid 116 and edge seals 120 maintain second fluid 116 over the electrowetting pixel array. Support plate 118 may be supported by edge seals 120 and a spacer grid 122, a portion of which is illustrated in FIG. 1. Spacer grid array 122 may substantially extend over the array of pixels 100. For example, portions of spacer grid 122 extend from tops 124 of pixel walls 110 to second support plate 118.

The reflective electrowetting display device has a viewing side 128 on which an image formed by the electrowetting display device may be viewed, and a rear side 130. Second support plate 118 faces viewing side 128 and first support plate 104 faces rear side 130. The electrowetting display device may be an active matrix driven display type or a passive matrix driven display, just to name a few examples.

Separation block 132 represents a discontinuity of electrical conductivity along electrode layer 102. For example, a first portion 134 of electrode layer 102 may be electrically insulated or separated from a second portion 136 and a third portion 138 of electrode layer 102 so that each portion 134, 136, and 138 is connected to a respective pixel region. Electrode layer 102 need not extend to edges of the display area of the electrowetting display device, as illustrated in the figure.

In some embodiments, electrowetting pixels may include a second electrode 140 disposed on second support plate 118, one or more color filters (not illustrated), or a black matrix (not illustrated). The electrode on the second support plate may or may not be patterned to form any of a number of circuit configurations, for example.

Hydrophobic layer 108 is arranged on first support plate 104 to create an electrowetting surface area. The hydrophobic character causes first fluid 112 to adhere preferentially to first support plate 104 since first fluid 112 has a higher wettability with respect to the surface of hydrophobic layer 108 than second fluid 116. Wettability relates to the relative affinity of a fluid for the surface of a solid. Wettability increases with increasing affinity, and it may be measured by the contact angle formed between the fluid and the solid and measured internal to the fluid of interest. For example, such a contact angle may increase from relative non-wettability for a contact angle of more than 90° to complete wettability for a contact angle of 0°, in which case the fluid tends to form a film on the surface of the solid.

First fluid 112 absorbs at least a part of the optical spectrum. First fluid 112 may be transmissive for a part of the optical spectrum, forming a color filter. For this purpose, the fluid may be colored by addition of pigment particles or dye, for example. Alternatively, first fluid 112 may be colored or black (e.g., absorbing substantially all parts of the optical spectrum) or reflecting. Hydrophobic layer 108 may be transparent or colored. A reflective layer may reflect the entire visible spectrum, making the layer appear white, or part of it, making it have a color.

If a voltage is applied across electrowetting pixel 100 (e.g., between electrode layer 102 and second electrode 140), electrowetting pixel 100 will enter into an active state. Electrostatic forces will move second fluid 116 toward electrode layer 102, thereby displacing first fluid 112 from the area of hydrophobic layer 108 to pixel walls 110 surrounding the area of hydrophobic layer 108, to a droplet-like shape. Such displacing action at least partly uncovers first fluid 112 from the surface of hydrophobic layer 108 of electrowetting pixel 100.

If the voltage across electrowetting pixel 100 is returned to an inactive signal level of zero or a value near to zero, electrowetting pixel 100 will return to an inactive state, where first fluid 112 flows back to cover hydrophobic layer 108. In this way, first fluid 112 forms an electrically controllable optical switch in each electrowetting pixel 100. Of course, such details of an electrowetting display device are merely examples, and claimed subject matter is not limited in this respect.

Figure 2:
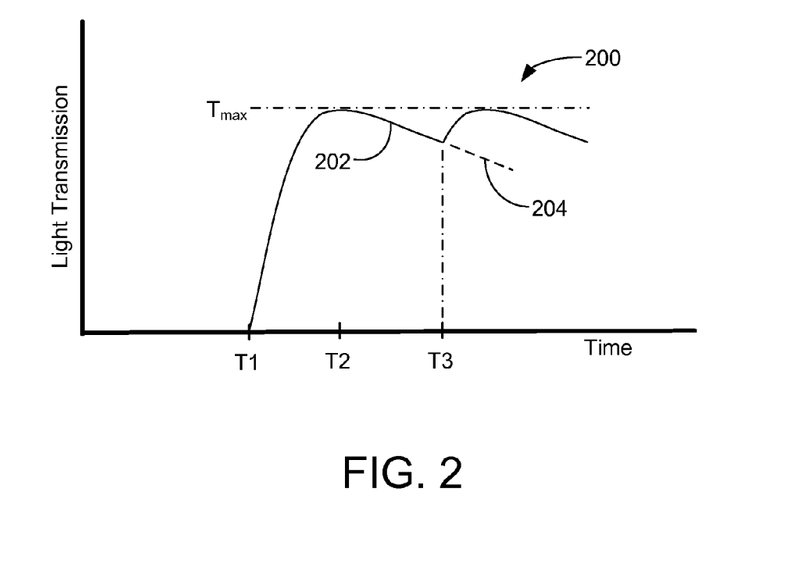
FIG. 2 is a plot of light throughput of an electrowetting pixel as a function of time, according to various embodiments.

FIG. 2 is a plot 200 of light throughput of electrowetting element 100 as a function of time, according to various embodiments. Electrowetting pixel 100 may be incorporated in a transmissive or reflective type of electrowetting display, and light throughput describes transmission or reflection, respectively, for such types of electrowetting displays. Here, throughput refers to the amount of light that arrives at hydrophobic layer 108, wherein the light may subsequently be reflected from a layer on the first support plate or the first support plate or may be transmitted through the layers and first support plate 104, for example.

Figure 3:
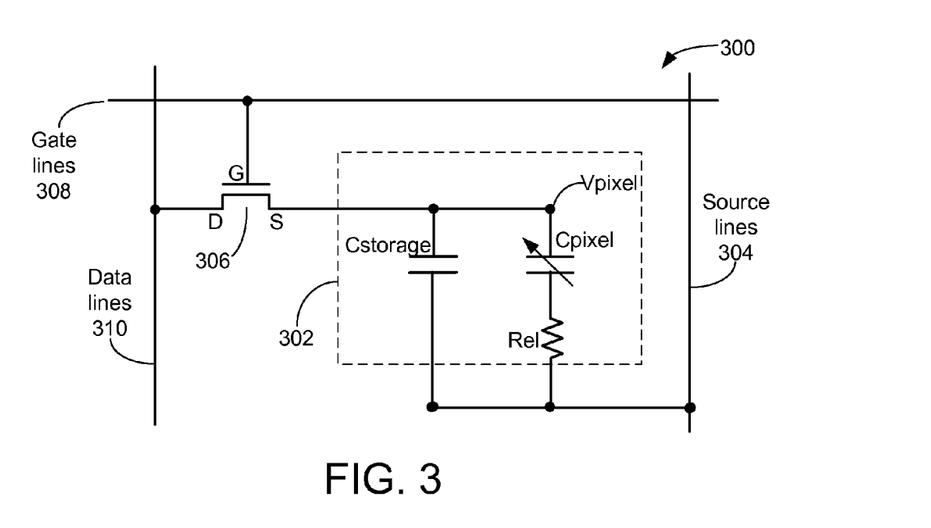
FIG. 3 is a schematic circuit diagram of a circuit of an electrowetting pixel, according to various embodiments.

Plot 200 demonstrates how backflow of first fluid 112 can affect light throughput through electrowetting pixel 100. In a first display period, before time T1, a voltage V applied between electrode layer 102 and second electrode 140 is zero, electrowetting pixel 100 is in an inactive state, and the light throughput is zero. At time T1, a voltage V applied between electrode layer 102 and second electrode 140 is set at a non-zero active signal level so that electrowetting pixel 100 will enter into an active state. For example, voltage V may be the voltage of the drain of a TFT 306, as shown in FIG. 3. Electrostatic forces move second fluid 116 toward hydrophobic layer 108 and first fluid 112 is consequently displaced from the area of hydrophobic layer 108 to pixel walls 110 surrounding the area of hydrophobic layer 108, to a droplet-like form. Thus, first fluid 112 uncovers the surface of hydrophobic layer 108 and light throughput rapidly increases to a transmission level $T_{max}$ at time T2.

During or after the application of voltage V, first fluid 112 will gradually flow back to increasingly cover hydrophobic layer 108, thereby reducing light throughput of electrowetting pixel 100. The decrease in light throughput due to backflow is indicated by the down-slope portion 202 in plot 200. Portion 202, and thus light throughput, continues to decrease over time. At time T3, a reset pulse is applied to counteract the effects of backflow. The reset pulse momentarily suspends backflow and induces first fluid motion over the pixel area. After the reset pulse, the data voltage for a corresponding grey level can be applied to the pixel for the duration of the display period. Reset pulses are sufficiently short so as not to produce flicker for an observer of the image of the electrowetting display. Subsequently, light throughput may increase back to $T_{max}$.

In contrast, without the reset pulse the transmission of the element would have followed the slanting dashed line 204 in plot 200. With a reset pulse, however, the transmission of the element can return to $T_{max}$. Although effects of a reset pulse are explained with reference to an electrowetting element operating in transmission, a similar explanation can be given for an electrowetting element operating in reflection, whereby the display state of the element is not represented by transmission but by reflection.

In some particular embodiments, the duration of a reset pulse may be in a range from about 0.5 milliseconds up to about 2 milliseconds, and the duration of a display period may be about 20 milliseconds. A reset pulse can reduce effects of backflow to such an extent that an observer need not perceive these effects. As mentioned above, reset pulses are sufficiently short so as not to produce flicker for an observer of the image of the electrowetting display.

FIG. 3 is a schematic circuit diagram of a circuit 300 of an electrowetting pixel of a display device, according to various embodiments. Circuit 300 includes a pixel portion 302 that includes the optical portion of electrowetting element 300. Here, referring to the example embodiment shown in FIG. 1, for example, such an optical portion includes first and second fluids 112 and 116, and portions of electrode layer 102 and second electrode 140. An electrical representation of the optical portion is shown in pixel portion 302. For example, capacitance Cpixel represents a capacitance formed by a multiple dielectric layer stack and fluids between two electrodes (e.g., the pixel electrode in electrode layer 102 and second electrode 140) of pixel portion 302. Varying states (e.g., configurations) of the fluids 112 and 116 may give rise to a varying capacitance. Cstorage represents a storage capacitor included in pixel portion 302. Rel represents electrical resistance of second fluid 116 (e.g., electrolyte). Vpixel is the voltage of pixel portion 302 with respect to a common voltage. For example, the common voltage may be on source lines 304. In some implementations, Vpixel is also the voltage of the source of TFT 306, which is used, among other things, to select electrowetting element 300 from an array of rows and columns of such electrowetting elements.

In some embodiments, pixel portion 302 is electrically connected to a reset controller (e.g., such as 702 illustrated in FIG. 7) that may comprise electronic circuitry, code executable by a processor, or a combination thereof. For example, a reset controller may be electrically connected to a top electrode such as second electrode 140 illustrated in FIG. 1. A bottom electrode (e.g., a portion of a TFT on a bottom support plate), such as a portion of electrode layer 102 illustrated in FIG. 1, includes storage capacitor Cstorage. The display device includes rows of gate lines 308 for selecting particular electrowetting elements and columns of data lines 310 for electrically driving the selected electrowetting elements. Gate lines 308 and data lines 310 may comprise conductive traces on a support plate (e.g., first support plate 104). Gate line 308 is electrically connected to the gate of TFT 306 to select or deselect electrowetting element 300. Data line 310 is electrically connected to the drain of TFT 306. The source of TFT 306 is electrically connected to pixel portion 302. In other implementations, different types of TFTs (e.g., n-type or p-type) may be used so that sources and drains may be reversed in the example descriptions herein. Claimed subject matter is not limited in this respect. Also, embodiments are described herein as having rows and columns of conductive lines (e.g., 308 and 310). However, the descriptions may include a switch between "rows" and "columns" without affecting the nature of such descriptions. Claimed subject matter is not limited in this respect.

Figure 4:
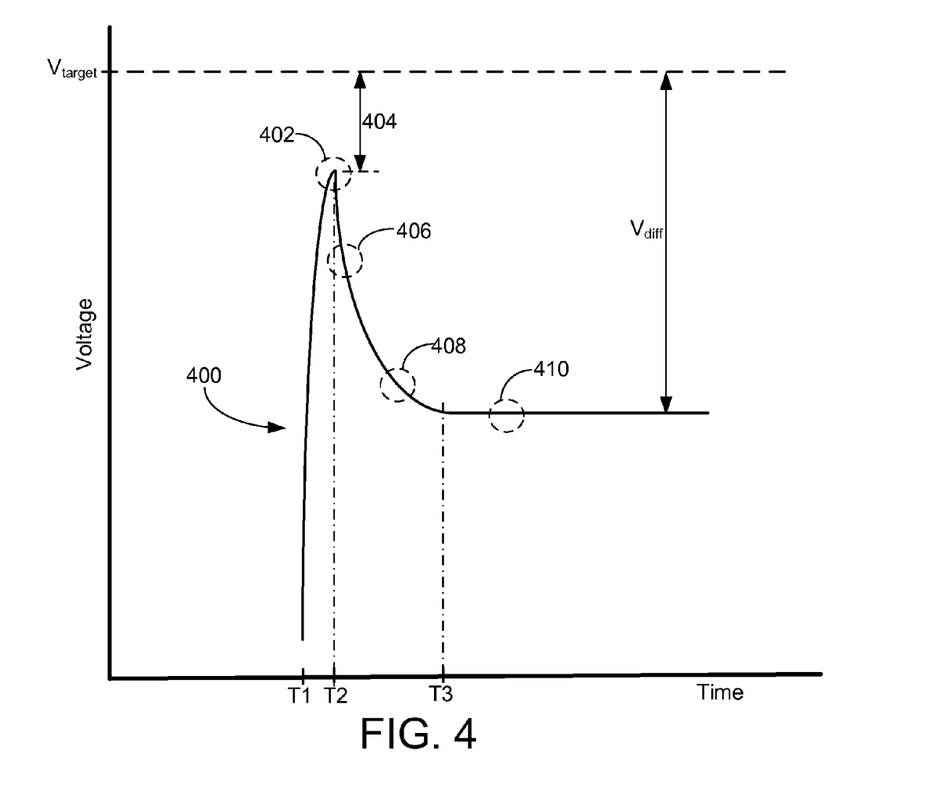
FIG. 4 is a plot of a portion of a reset voltage pulse as a function of time for an electrowetting pixel, according to various embodiments.

FIG. 4 is a plot of a portion of a reset pulse 400 as a function of time for an electrowetting pixel, according to various embodiments. For example, reset pulse 400 may be applied to pixel portion 302 by reset controller 308, referring to FIG. 3. Reset pulse is, for example, a square pulse having a target amplitude of $V_{target}$ and a pulse width of about 1 millisecond. In such a case, a time span between T1 and T3 may be a small fraction of the pulse width, such as 10 microseconds, for example. The time span from T1 to T3 includes a transient response to the application of reset pulse 400. In the example illustrated, reset pulse 400 begins to be applied at time T1 and includes a rising edge to time T2. Subsequently, reset pulse decays (e.g., corresponding at least approximately to an RC (resistance-capacitance) time constant) from time T2 to time T3.

Various portions of reset pulse 400 are identified. Undercharge (e.g., which may occur in the word line(s)) effect tends to contribute to the voltage at portion 402. For example, intrinsic capacitances and resistances (e.g., Cpixel and Rel) in pixel portion 302 are associated with an RC time constant that affects the response of the pixel portion to applied reset pulse 400. One such effect is that reset pulse 400, with a target amplitude voltage, falls short of $V_{target}$ by a voltage difference 404.

Voltage kickback (e.g., based, at least in part, on intrinsic capacitances in pixel portion 302) effect tends to contribute to the voltage at portion 406. R-electrolyte effect, e.g. "Rel" in FIG. 3, tends to contribute to the voltage at portion 408. Pixel capacitance and TFT leakage (e.g., TFT 306) tends to contribute to the voltage at portion 410. For example, TFT 306 may experience drain-gate (D-G) and source-gate (S-G) current leakages.

As a result of such effects, the steady-state amplitude of reset pulse 400 may be less than $V_{target}$ by a voltage $V_{diff}$. For a numerical example, $V_{target}$ may be about 10 volts and $V_{diff}$ may be about 3.6 volts, though claimed subject matter is not limited in this respect.

Figure 5:
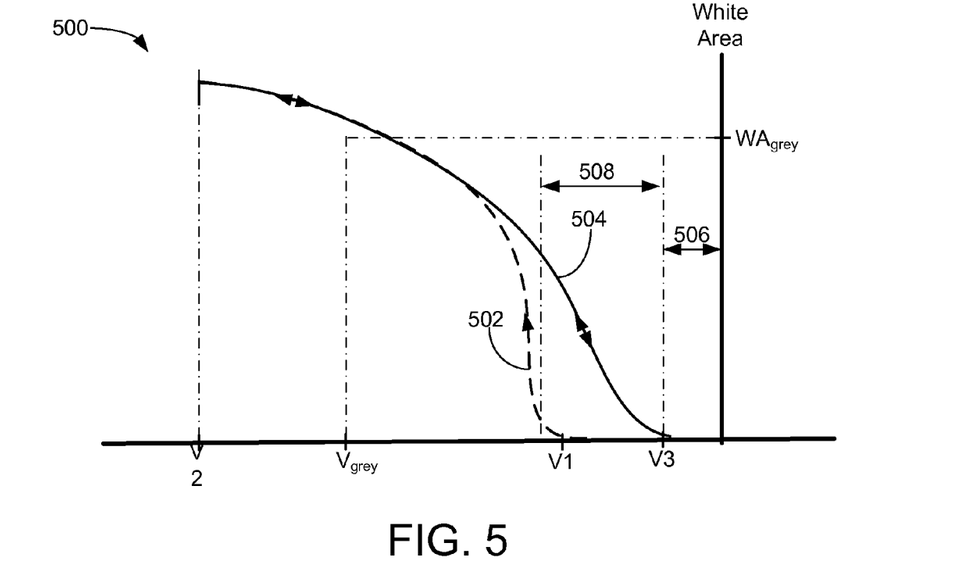
FIG. 5 is a plot of relative white area of an electrowetting pixel as a function of drive voltage for the electrowetting pixel, according to various embodiments.

FIG. 5 is a plot 500 of relative white area (e.g., area of electrowetting pixel contributing to light throughput) of an electrowetting pixel, such as 100, as a function of drive voltage for the electrowetting pixel, according to various embodiments. For example, such drive voltage may be applied by a display control circuit (not illustrated in FIG. 5) via a data line 310, illustrated in FIG. 3. For the embodiments described, drive voltage of a pixel is negative. In other embodiments, however, drive voltage may be positive or may be both positive and negative while operating with alternating current (AC). Claimed subject matter is not limited to any such drive scheme.

Plot 500 includes a hysteresis curve that includes an initial curve portion 502 and an operating curve portion 504. Such a hysteresis curve generally describes the electro-optical relation between white area and voltage driving an electrowetting pixel. At the beginning of an operating cycle, for example, drive voltage, beginning substantially at zero volts, may increase negatively to a transition voltage V1. At this voltage, oil uniformly covering an (e.g., reflective) optical surface (e.g., white area) of the pixel begins to contract and expose the optical surface, thus exposing the white area of the pixel. As the drive voltage continues to increase, the oil increasingly contracts exposing an increasing amount of relative white area of the pixel. Initial curve portion 502 represents the relation between the relative white area and the drive voltage until the drive voltage reaches a maximum drive voltage V2.

Initial curve portion 502 may transition to operating curve portion 504 upon and after the drive voltage reaches V2. Subsequently, the pixel may be operated by varying the drive voltage along operating curve portion 504 to particular values that render desired grey levels, which correspond to the relative white area of the pixel. For example, to render a particular grey value corresponding to relative white area $WA_{grey}$, the pixel may be operated at a drive voltage $V_{grey}$, illustrated in FIG. 5.

While drive voltage may be maintained at a particular value to render a particular grey level, a reset pulse may be cyclically applied to the pixel, as described above. During such a reset pulse, for example, the voltage applied to the pixel may follow operating curve portion 504 from $V_{grey}$ to substantially zero volts, and then return to $V_{grey}$ at the end of the reset pulse. Such a cycle may repeat during a period when $WA_{grey}$ is displayed by the pixel. However, due, at least in part, to effects described above for FIG. 4 (e.g., undercharge, voltage kickback, R-electrolyte, and pixel capacitance and TFT leakage), the voltage applied to the pixel during a reset pulse may not achieve zero volts. Instead, the voltage during the reset pulse may experience an offset 506 by several volts. For example, such an offset may correspond to $V_{diff}$ illustrated in FIG. 4.

One consequence of such a voltage offset is a decreased resolution of grey levels at the lower range of the drive voltage. For example, in plot 500, V3 corresponds to voltage offset 506. A lower range 508 of drive voltage includes the relatively steep slope of operating curve portion 504 ending at V3. The number of grey scale values available for display tends to decrease as the slope of operating curve portion 504 increases.

In various embodiments, to mitigate the effects due to inherent physical properties of the pixel, a reset pulse offset may be added to the reset pulse. The amount of such a reset pulse offset may be based, at least in part, on a grey level to be rendered by the pixel, as described below.

To generate greyscale levels by modifying the reset pulse with an add-on to the reset pulse, motion of oil in the pixel may be assumed to be in a non-saturated regime to help ensure that the voltage applied to the pixel provides expected fluid responses. (The non-saturated regime is where the Young-Lippmann equation satisfies the voltage-contact angle plot). In such a case, the fluid motion may be predicted by the Young-Lippmann equation:

$$\cos(\theta)=\cos(\theta_0)+(\in_0 \cdot \in_r)/(2d \cdot \gamma_{LV}) \cdot V^2, \quad \text{Equation 1}$$

where $\theta$ is the (apparent) contact angle, $\theta_0$ is the initial contact angle of the fluid system (e.g., the oil) at rest, $\in_0$ is the dielectric constant of vacuum, $\in_r$ is the relative dielectric constant, d is the thickness of the oil, $\gamma_{LV}$ is the oil surface tension, and V is the voltage applied to the pixel.

In terms of the electrowetting point (EWp), fluid motion may at least partially behave according to the relation $$EWp=V^2/d_\in, \quad \text{Equation 2}$$

where $d_\in=d/\in_r$. The present example considers a constant dielectric thickness ($d_\in$) and also a substantially constant oil thickness (so there is no change in white area (WA) across the optical surface of the pixel). Oil thickness may be directly related to the display reflectance and may impact what grey level is perceived by a viewer of the pixel. As an example, considering a dielectric thickness ($d_\in$) of 300 nm, a driving voltage of 25 volts, and 70% white area (WA), a pixel may have 20% reflectance (R). Based on such example conditions and values, a table including a number of pixel parameters may be determined, as illustrated by the example Table 1 below.

TABLE 1

| Greyscale Value | $V_{drive}$ (volts) | $V_{reset}$ (volts) | EWp (V2/μm) | WA (%) | R (%) |
|---|---|---|---|---|---|
| 63 (white) | 30 | 0.5 | 2000 | 100 | 100 |
| 48 | 25 | 2 | 1500 | 80 | 80 |
| 36 | 15 | 4 | 750 | 75 | 75 |
| 20 | 10 | 7 | 350 | 60 | 60 |
| 7 | 5 | 9 | 100 | 30 | 30 |
| 0 (black) | 3 | 0 | 20 | 0 | 10 |

For example, Table 1 considers 64 grey scales for the pixel. For example Table 1 may be used to provide values for a display having 64 available grey scales. Table 1 is based, at least in part, on the electro-optical curve (EOC) of an electrowetting pixel, such as operating curve portion 504, illustrated in FIG. 5.

A table of values, such as Table 1, may be generated by calculating values using an algorithm that determines voltage offsets to be added to pre-programmed reset voltage levels. While the values shown in Table 1 are for reset voltages, offset voltage values may be used also or instead.

A table of values, such as Table 1, may be stored in a memory of a display device as a lookup table accessible by a voltage controller, for example. For example, referring to Table 1, a voltage controller may provide a reset pulse of 7 volts for a target greyscale value of 20, which corresponds to a reflectance of 60%. In this fashion, the voltage controller may generate more greyscales as compared to the case where reset pulse offset is not included in pixel operation.

Figure 6:
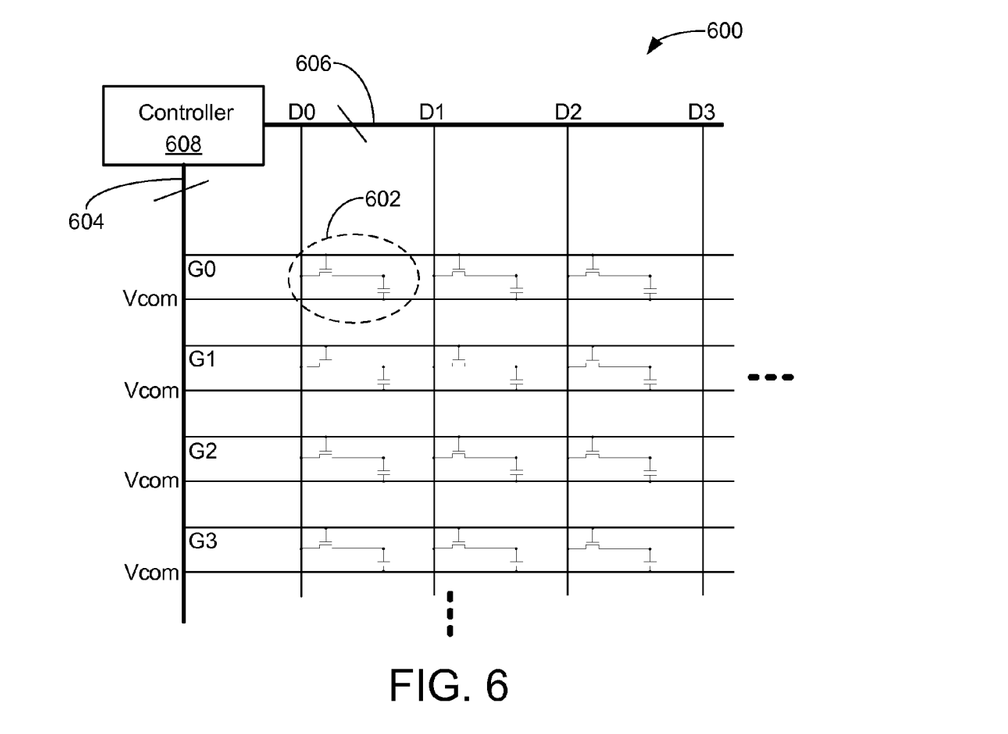
FIG. 6 is a schematic circuit diagram of a portion of an electrowetting pixel array of an electrowetting display device, according to various embodiments.

FIG. 6 is a schematic circuit diagram of a portion of a pixel array of an electrowetting display device 600, according to various embodiments. Electrowetting display device 600 includes a plurality of electrowetting elements 602 arranged in rows and columns of a matrix. For example, electrowetting display device 600 can include hundreds or thousands of such rows and columns of electrowetting elements 602. Electrowetting elements 602 may be similar to or the same as electrowetting elements 300 shown in FIG. 3. For sake of clarity, a storage capacitor of each electrowetting pixel, such as Cstorage illustrated in FIG. 3, is not included in FIG. 6. Electrowetting elements 602 are electrically connected in the matrix to rows of gate lines G0, G1, G2, G3 . . . , columns of data lines D0, D1, D2, D3 . . . , and rows of reset voltage lines Vcom. Though Vcom lines are shown as rows, Vcom lines may instead be aligned in columns or any other configuration, and claimed subject matter is not so limited. The gate lines, data lines, and reset voltage lines are electrically connected to a plurality of conductors (e.g., wires, conductive traces, and so on) represented by lines 604 and 606 in FIG. 6. Electrical signals (e.g., waveforms, voltage levels, and so on) are provided to the gate lines, data lines, and reset voltage lines by a controller 608 via lines 604 and 606. In particular, reset voltage lines may provide reset pulses, such as reset pulse 400 illustrated in FIG. 4, to pixels 602. As described above, amplitudes of such reset pulses may be based, at least in part, on desired grey scales for each of the pixels.

Controller 608 may be a processor, a CPU, or an ASIC, just to name a few examples. Functions of controller 608 may be implemented by software, hardware, or both. Controller 608 may affect optical transmission of the electrowetting elements 602 by increasing or decreasing voltage on the data lines and by generating the reset signals, for example.

In particular, individual electrowetting elements 602 are electrically connected to (i) one of the data lines to provide a source signal to a TFT (e.g., TFT 306), (ii) one of the gate lines to provide a gate signal to the TFT, and (iii) one of the reset voltage lines to provide a reset voltage to the individual electrowetting element 602.

Figure 7:
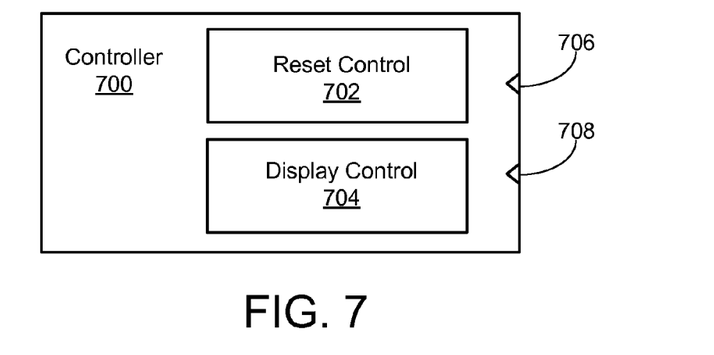
FIG. 7 is a block diagram of a controller for an electrowetting display device, according to various embodiments.

FIG. 7 is a block diagram of a controller 700 for an electrowetting display device, according to various embodiments. For example, controller 700 may be the same as or similar to controller 608 shown in FIG. 6. Controller 700 includes, among other things, a reset control block 702 and a display control block 704. Though shown as two separate blocks, reset control block 702 and display control block 704 may be separate or single electrical circuits or multiple circuits in a single package, code executable by one or more processors, or any combination thereof. For example, reset control block 702 may comprise logic circuitry and/or a processor for executing code.

Reset control block 702 may be in electrical contact with an electrode layer (e.g., electrode layer 102, illustrated in FIG. 1) of the electrowetting display device. In some implementations, reset control block 702 may electrically connect to the electrode layer via an output port 706, from where reset pulses may be provided to the electrowetting display device from controller 700. Via the electrode layer, reset control block 702 may provide a reset pulse to individual pixels of the electrowetting display device, such as in the rows and columns of the electrowetting elements 602 shown in FIG. 6.

In some particular embodiments, a pixel of an electrowetting display device may be in an on-state if a voltage difference between a first electrode (e.g., first electrode 102, illustrated in FIG. 1) and the second electrode of the electrowetting pixel is a negative value. On the other hand, the electrowetting pixel may be in an off-state if the voltage difference between the first electrode and the second electrode of the electrowetting pixel is zero. For an example of negative voltage driving, such as in embodiments described above, the negative value of the on-state may be approximately −30 volts for a particular grey scale value and the off-state may be zero volts. For an example of AC voltage driving, the negative value of the on-state may be approximately −15 volts and the positive value of the on-state may be approximately 15 volts. Of course, such voltage values are merely examples, and claimed subject matter is not so limited.

The reset pulse may at least momentarily set the voltage from the first electrode to the second electrode of the electrowetting pixels to zero regardless of the state of the electrowetting pixels. In some implementations, the reset pulse may be a square pulse, a sawtooth pulse, or a triangular pulse, just to name a few examples.

Display control block 704 may be in electrical contact with gate lines and data lines, such as gate lines G0, G1, G2 . . . and data lines D0, D1, D2 . . . , as shown in FIG. 6. Gate lines and data lines electrically connect to individual pixels of the electrowetting display device. In some implementations, display control block 704 may electrically connect to the gate lines and the data lines via an output port 708, from where control signals may be provided to the electrowetting display device from controller 700.

Figure 8:
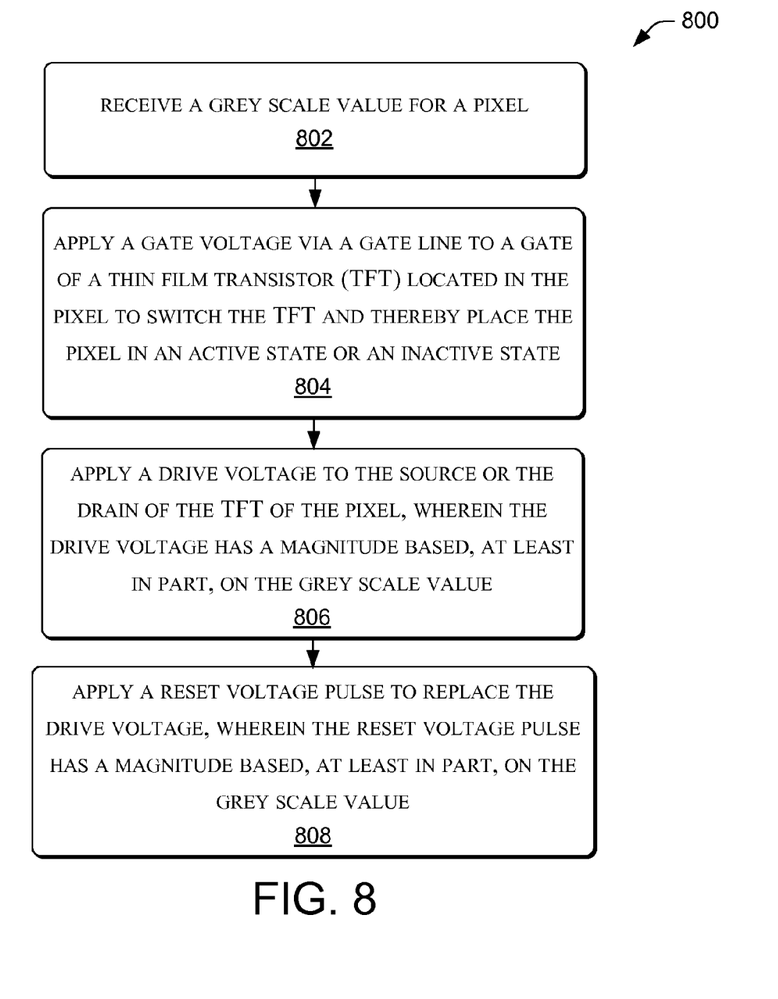
FIG. 8 is a flow diagram of a process for operating an electrowetting display device, according to various example embodiments.

FIG. 8 is a flow diagram of a process 800 for operating an electrowetting display device, according to various example embodiments. For example, such an electrowetting display device may include electrowetting elements such as 100 or 302 shown in FIGS. 1 and 3, respectively. Process 800 may be performed by controller 700 or one or more processors (e.g., processor(s) 910, shown in FIG. 9), for example. Process 800 is described as being performed by controller 700.

At block 802, controller 700 receives a grey scale value for a pixel. For example, such a grey value may be associated with a desired reflectance of the pixel for an image displayed by an electrowetting display device. At block 804, controller 700 may apply a gate voltage via a gate line (e.g., gate line 308) to a gate of a TFT (e.g., TFT 306) located in the pixel (e.g., 302) to switch the TFT and thereby place the pixel in an active state or an inactive state. In particular, a gate voltage applied to the gate of the TFT switches the TFT located in individual electrowetting pixels to select the electrowetting pixels. For example, display control block 704 may generate electrical signals that are provided, via output port 708, to the gate of the TFT. In a particular implementation, the gate of the TFT may be set from ground voltage to a relatively high (e.g., about 5 volts) voltage to place the TFT in a conductive state (e.g., thus switching the TFT).

At block 806, controller 700 may apply a drive voltage to the source or the drain of the TFT of the pixel. The drive voltage may have a magnitude based, at least in part, on the grey scale value. At block 808, controller 700 may apply a reset voltage pulse to replace the drive voltage. The reset voltage pulse may also have a magnitude based, at least in part, on the grey scale value. For example, the reset voltage may be across an electrolyte solution (e.g., second fluid 116, illustrated in FIG. 1) of the electrowetting display device, though claimed subject matter is not limited in this respect.

Figure 9:
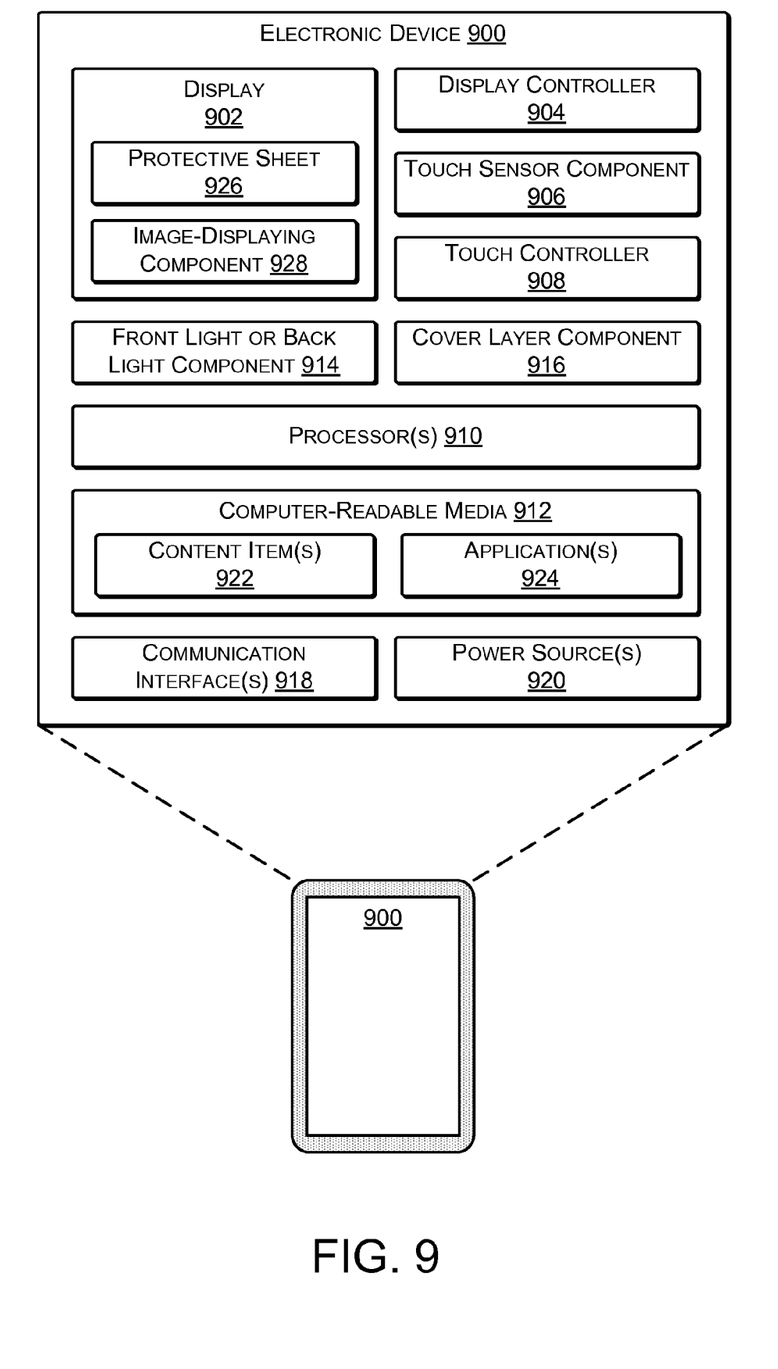
FIG. 9 illustrates an example electronic device that may incorporate a display device, according to some embodiments.

FIG. 9 illustrates an example electronic device 900 that may incorporate any of the display devices discussed above. The device 900 may comprise any type of electronic device having a display. For instance, the device 900 may be a mobile electronic device (e.g., an electronic book reader, a tablet computing device, a laptop computer, a smart phone or other multifunction communication device, a portable digital assistant, a wearable computing device, an automotive display, etc.). Alternatively, the device 900 may be a non-mobile electronic device (e.g., a computer display, a television, etc.). In addition, while FIG. 9 illustrates several example components of the electronic device 900, it is to be appreciated that the device 900 may also include other conventional components, such as an operating system, system busses, input/output components, and the like. Further, in other examples, such as in the case of a television or computer monitor, the electronic device 900 may only include a subset of the components illustrated.

Regardless of the specific implementation of the electronic device 900, the device 900 includes a display 902 and a corresponding display controller 904. The display 902 may represent a reflective or transmissive display in some instances, such as an electronic paper display, a reflective or transmissive LCD display, or the like. Electronic paper displays represent an array of display technologies that largely mimic the look of ordinary ink on paper. In contrast to conventional backlit displays, electronic paper displays typically reflect light, much as ordinary paper does. In addition, electronic paper displays are often bi-stable, meaning that these displays are capable of holding text or other rendered images even if very little or no power is supplied to the display. Some examples of the display 902 that may be used with the implementations described herein include bi-stable LCD displays, micro electromechanical system (MEMS) displays, such as interferometric modulator displays, cholesteric displays, electrophoretic displays, electrofluidic pixel displays, electrowetting displays, photonic ink displays, gyricon displays, and the like. In other implementations, or for other types of devices 900, the display 902 may be an active display such as a liquid crystal display, a plasma display, a light emitting diode display, an organic light emitting diode display, and so forth. Accordingly, implementations herein are not limited to any particular display technology.

In an implementation, the display comprises an electrowetting display that employs an applied voltage to change the surface tension of a fluid in relation to a surface. For example, such an electrowetting display may include the array of pixels 100 illustrated in FIG. 1, though claimed subject matter is not limited in this respect. By applying a voltage across a portion of an electrowetting pixel of an electrowetting display, wetting properties of a surface may be modified so that the surface becomes increasingly hydrophilic. As one example of an electrowetting display, the modification of the surface tension acts as an optical switch by contracting a colored oil film if a voltage is applied to individual pixels of the display. If the voltage is absent, the colored oil forms a continuous film within a pixel, and the color may thus be visible to a user of the display. On the other hand, if the voltage is applied to the pixel, the colored oil is displaced and the pixel becomes transparent. If multiple pixels of the display are independently activated, the display may present a color or grayscale image. The pixels may form the basis for a transmissive, reflective, transparent or transmissive/reflective (transflective) display. Further, the pixels may be responsive to high switching speeds (e.g., on the order of several milliseconds), while employing small pixel dimensions. Accordingly, the electrowetting displays herein may be suitable for applications such as displaying video content.

Of course, while several different examples have been given, it is to be appreciated that the reflective displays described herein may comprise any other type of electronic-paper technology or reflective-display technology, examples of which are provided above. In addition, while some of the examples described above are discussed as rendering black, white, and varying shades of gray, it is to be appreciated that the described techniques apply equally to reflective displays capable of rendering color pixels. As such, the terms "white," "gray," and "black" may refer to varying degrees of color in implementations utilizing color displays. For instance, where a pixel includes a red color filter, a "gray" value of the pixel may correspond to a shade of pink while a "black" value of the pixel may correspond to a darkest red of the color filter. Furthermore, while some examples herein are described in the environment of a reflective display, in other examples, the display 902 may represent a backlit display, examples of which are mentioned above.

In addition to including the display 902, FIG. 9 illustrates that some examples of the device 900 may include a touch sensor component 906 and a touch controller 908. In some instances, at least one touch sensor component 906 resides with, or is stacked on, the display 902 to form a touch-sensitive display (e.g., an electronic paper touch-sensitive display). Thus, the display 902 may be capable of both accepting user touch input and rendering content in response to or corresponding to the touch input. As several examples, the touch sensor component 906 may comprise a capacitive touch sensor, a force sensitive resistance (FSR), an interpolating force sensitive resistance (IFSR) sensor, or any other type of touch sensor. In some instances, the touch sensor component 906 is capable of detecting touches as well as determining an amount of pressure or force of these touches.

FIG. 9 further illustrates that the electronic device 900 may include one or more processors 910 and one or more computer-readable media 912, as well as a front light component 914 (which may alternatively be a backlight component in the case of a backlit display) for lighting the display 902, a cover layer component 916, such as a cover glass or cover sheet, one or more communication interfaces 918 and one or more power sources 920. The communication interfaces 918 may support both wired and wireless connection to various networks, such as cellular networks, radio, WiFi networks, short range networks (e.g., Bluetooth®), infrared (IR), and so forth.

Depending on the configuration of the electronic device 900, the computer-readable media 912 (and other computer-readable media described throughout) is an example of computer storage media and may include volatile and non-volatile memory. Thus, the computer-readable media 912 may include, but is not limited to, RAM, ROM, EEPROM, flash memory, or other memory technology, or any other medium that may be used to store computer-readable instructions, programs, applications, media items, and/or data which may be accessed by the electronic device 900.

The computer-readable media 912 may be used to store any number of functional components that are executable on the processor 910, as well as content items 922 and applications 924. Thus, the computer-readable media 912 may include an operating system and a storage database to store one or more content items 922, such as eBooks, audio books, songs, videos, still images, and the like. The computer-readable media 912 of the electronic device 900 may also store one or more content presentation applications to render content items on the device 900. These content presentation applications may be implemented as various applications 924 depending upon the content items 922. For instance, the content presentation application may be an electronic book reader application for rending textual electronic books, an audio player for playing audio books or songs, a video player for playing video, and so forth.

In some instances, the electronic device 900 may couple to a cover (not illustrated in FIG. 9) to protect the display (and other components in the display stack or display assembly) of the device 900. In one example, the cover may include a back flap that covers a back portion of the device 900 and a front flap that covers the display 902 and the other components in the stack. The device 900 and/or the cover may include a sensor (e.g., a Hall Effect sensor) to detect if the cover is open (i.e., if the front flap is not atop the display and other components). The sensor may send a signal to the front light component 914 if the cover is open and, in response, the front light component 914 may illuminate the display 902. If the cover is closed, meanwhile, the front light component 914 may receive a signal indicating that the cover has closed and, in response, the front light component 914 may turn off.

Furthermore, the amount of light emitted by the front light component 914 may vary. For instance, upon a user opening the cover, the light from the front light may gradually increase to its full illumination. In some instances, the device 900 includes an ambient light sensor (not illustrated in FIG. 9) and the amount of illumination of the front light component 914 may be based at least in part on the amount of ambient light detected by the ambient light sensor. For example, the front light component 914 may be dimmer if the ambient light sensor detects relatively little ambient light, such as in a dark room; may be brighter if the ambient light sensor detects ambient light within a particular range; and may be dimmer or turned off if the ambient light sensor detects a relatively large amount of ambient light, such as direct sunlight.

In addition, the settings of the display 902 may vary depending on whether the front light component 914 is on or off, or based on the amount of light provided by the front light component 914. For instance, the electronic device 900 may implement a larger default font or a greater contrast if the light is off compared to if the light is on. In some instances, the electronic device 900 maintains, if the light is on, a contrast ratio for the display that is within a certain defined percentage of the contrast ratio if the light is off.

As described above, the touch sensor component 906 may comprise a capacitive touch sensor that resides atop the display 902. In some examples, the touch sensor component 906 may be formed on or integrated with the cover layer component 916. In other examples, the touch sensor component 906 may be a separate component in the stack of the display assembly. The front light component 914 may reside atop or below the touch sensor component 906. In some instances, either the touch sensor component 906 or the front light component 914 is coupled to a top surface of a protective sheet 926 of the display 902. As one example, the front light component 914 may include a lightguide sheet and a light source (not illustrated in FIG. 9). The lightguide sheet may comprise a substrate (e.g., a transparent thermoplastic such as PMMA or other acrylic), a layer of lacquer and multiple grating elements formed in the layer of lacquer that function to propagate light from the light source towards the display 902, thus illuminating the display 902.

The cover layer component 916 may include a transparent substrate or sheet having an outer layer that functions to reduce at least one of glare or reflection of ambient light incident on the electronic device 900. In some instances, the cover layer component 916 may comprise a hard-coated polyester and/or polycarbonate film, including a base polyester or a polycarbonate, that results in a chemically bonded UV-cured hard surface coating that is scratch resistant. In some instances, the film may be manufactured with additives such that the resulting film includes a hardness rating that is greater than a predefined threshold (e.g., at least a hardness rating that is resistant to a 3h pencil). Without such scratch resistance, a device may be more easily scratched and a user may perceive the scratches from the light that is dispersed over the top of the reflective display. In some examples, the protective sheet 926 may include a similar UV-cured hard coating on the outer surface. The cover layer component 916 may couple to another component or to the protective sheet 926 of the display 902. The cover layer component 916 may, in some instances, also include a UV filter, a UV-absorbing dye, or the like, for protecting components lower in the stack from UV light incident on the electronic device 900. In still other examples, the cover layer component 916 may include a sheet of high-strength glass having an antiglare and/or antireflective coating.

The display 902 includes the protective sheet 926 overlying an image-displaying component 928. For example, the display 902 may be preassembled to have the protective sheet 926 as an outer surface on the upper or image-viewing side of the display 902. Accordingly, the protective sheet 926 may be integral with and may overlie the image-displaying component 928. The protective sheet 926 may be optically transparent to enable a user to view, through the protective sheet 926, an image presented on the image-displaying component 928 of the display 902.

In some examples, the protective sheet 926 may be a transparent polymer film in the range of 25 to 200 micrometers in thickness. As several examples, the protective sheet may be a transparent polyester, such as polyethylene terephthalate (PET) or polyethylene naphthalate (PEN), or other suitable transparent polymer film or sheet, such as a polycarbonate or an acrylic. In some examples, the outer surface of the protective sheet 926 may include a coating, such as the hard coating described above. For instance, the hard coating may be applied to the outer surface of the protective sheet 926 before or after assembly of the protective sheet 926 with the image-displaying component 928 of the display 902. In some examples, the hard coating may include a photoinitiator or other reactive species in its composition, such as for curing the hard coating on the protective sheet 926. Furthermore, in some examples, the protective sheet 926 may be dyed with a UV-light-absorbing dye, or may be treated with other UV-absorbing treatment. For example, the protective sheet may be treated to have a specified UV cutoff such that UV light below a cutoff or threshold wavelength is at least partially absorbed by the protective sheet 926, thereby protecting the image-displaying component 928 from UV light.

According to some implementations herein, one or more of the components discussed above may be coupled to the display 902 using fluid optically-clear adhesive (LOCA). For example, suppose that the light guide portion of the front light component 914 is to be coupled to the display 902. The light guide may be coupled to the display 902 by placing the LOCA on the outer or upper surface of the protective sheet 926. If the LOCA reaches the corner(s) and/or at least a portion of the perimeter of protective sheet, UV-curing may be performed on the LOCA at the corners and/or the portion of the perimeter. Thereafter, the remaining LOCA may be UV-cured and the front light component 914 may be coupled to the LOCA. By first curing the corner(s) and/or perimeter, the techniques effectively create a barrier for the remaining LOCA and also prevent the formation of air gaps in the LOCA layer, thereby increasing the efficacy of the front light component 914. In other implementations, the LOCA may be placed near a center of the protective sheet 926, and pressed outwards towards a perimeter of the top surface of the protective sheet 926 by placing the front light component 914 on top of the LOCA. The LOCA may then be cured by directing UV light through the front light component 914. As discussed above, and as discussed additionally below, various techniques, such as surface treatment of the protective sheet, may be used to prevent discoloration of the LOCA and/or the protective sheet 926.

While FIG. 9 illustrates a few example components, the electronic device 900 may have additional features or functionality. For example, the device 900 may also include additional data storage devices (removable and/or non-removable) such as, for example, magnetic disks, optical disks, or tape. The additional data storage media, which may reside in a control board, may include volatile and nonvolatile, removable and non-removable media implemented in any method or technology for storage of information, such as computer readable instructions, data structures, program modules, or other data. In addition, some or all of the functionality described as residing within the device 900 may reside remotely from the device 900 in some implementations. In these implementations, the device 900 may utilize the communication interfaces 918 to communicate with and utilize this functionality.

Although the subject matter has been described in language specific to structural features and/or methodological acts, it is to be understood that the subject matter defined in the appended claims is not necessarily limited to the specific features or acts described. Rather, the specific features and acts are disclosed as illustrative forms of implementing the claims.

One skilled in the art will realize that a virtually unlimited number of variations to the above descriptions are possible, and that the examples and the accompanying figures are merely to illustrate one or more examples of implementations.

It will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

In the detailed description above, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

What is claimed is:

1. An electrowetting display device comprising:
   a plurality of pixel regions, wherein a pixel region of the plurality of pixel regions includes:
      a hydrophobic layer portion;
      an oil disposed on the hydrophobic layer portion, wherein a grey scale value produced by the pixel region is based, at least in part, on an area of the hydrophobic layer portion that is covered by the oil; and
      a thin film transistor (TFT);
   a data line in electrical contact with at least one of (i) a source or (ii) a drain of the TFT of the pixel region;
   a gate line in electrical contact with a gate of the TFT of the pixel region;
   a drive control circuit in electrical contact with the drain or the source of the TFT and to apply a drive voltage to the TFT of the pixel region for a first duration, wherein the drive voltage results in a particular area of the hydrophobic layer portion being covered by the oil so that the pixel region produces a particular grey scale value; and
   a reset control circuit in electrical contact with the drain or the source of the TFT and to provide periodic reset voltage pulses to the drain or the source of the TFT so as to reduce backflow of the oil, wherein the reset control circuit is electronically configured to generate each of the reset voltage pulses (i) to have a duration that is less than one-tenth the first duration and (ii) to have a magnitude that is a sum of a pre-programmed voltage value and a calculated offset voltage value that is based, at least in part, on the particular grey scale value.

2. The electrowetting display device of claim 1, further comprising a memory device accessible by the reset control circuit and storing a lookup table including the particular grey scale value and a corresponding magnitude of the pre-programmed voltage value.

3. The electrowetting display device of claim 1, wherein the reset voltage pulses each comprise a square pulse having a width less than 10 percent of a width of the drive voltage applied to the TFT of the pixel region.

4. An electrowetting display device comprising:
pixel regions arranged in rows and columns, wherein a pixel region of the pixel regions includes:
a first fluid;
a hydrophobic layer portion disposed on an electrode; and
a thin film transistor (TFT) that is in electrical contact with the electrode; and
a control circuit in electrical contact with at least one of a drain or a source of the TFT of the pixel region and electronically configured to:
receive an instruction to drive the pixel region to display a particular grey scale value;
receive a pre-programmed voltage value;
receive a calculated offset voltage value that is based, at least in part, on the particular grey scale value;
provide a drive voltage to the drain or the source of the TFT for a first duration, wherein the drive voltage is based, at least in part, on the particular grey scale value;
generate a reset voltage pulse to reduce backflow of the first fluid, the reset voltage pulse having (i) a duration that is less than one-tenth the first duration and (ii) a magnitude that is a sum of the pre-programmed voltage value and the calculated offset voltage value; and
provide the reset voltage pulse to at least one of the drain or the source of the TFT.

5. The electrowetting display device of claim 4, further comprising:
a memory accessible by the control circuit and to store at least one lookup table that includes the particular grey scale value and a corresponding magnitude of the pre-programmed voltage value.

6. The electrowetting display device of claim 4, further comprising:
a memory accessible by the control circuit and to store at least one lookup table that includes values for the drive voltage and corresponding magnitudes of a plurality of reset voltage pulses.

7. The electrowetting display device of claim 4, further comprising:
a data line in electrical contact with one of (i) the source or (ii) the drain of the TFT of the pixel region; and
a gate line in electrical contact with a gate of the TFT of the pixel region.

8. The electrowetting display device of claim 7, wherein the pixel region is in electrical contact with the data line and the gate line, and wherein the control circuit is capable of providing (i) a source signal to the TFT via the data line and (ii) a gate signal to the TFT via the gate line.

9. The electrowetting display device of claim 7, wherein the reset control circuit is capable of increasing or decreasing a magnitude of a voltage on the data line based, at least in part, on a grey scale value applied to the pixel region on the data line for an image displayed by the electrowetting display device.

10. The electrowetting display device of claim 4, wherein the reset voltage pulse has a width in a range of about 0.5 milliseconds to about 2.0 milliseconds.

11. The electrowetting display device of claim 4, wherein the reset pulse comprises a square pulse.

12. A method for operating an electrowetting display device, the method comprising:
receiving a grey scale value for a pixel;
receiving a pre-programmed voltage value;
receiving a calculated offset voltage value that is based, at least in part, on the grey scale value;
applying a gate voltage via a gate line to a gate of a thin film transistor (TFT) located in the pixel to switch the TFT and thereby place the pixel in an active state;
applying a drive voltage to a source or a drain of the TFT for a first duration, and wherein the drive voltage has a magnitude based, at least in part, on the grey scale value;
generating a reset voltage pulse to reduce backflow of a first fluid of the pixel, the reset voltage pulse having a duration less than one-tenth the first duration and a magnitude that is a sum of the pre-programmed voltage value and the calculated offset voltage value; and
applying the reset voltage pulse to replace the drive voltage.

13. The method of claim 12, wherein the reset voltage pulse has a magnitude further based, at least in part, on the magnitude of the drive voltage.

14. The method of claim 12, further comprising determining the pre-programmed voltage value from a lookup table.

15. The method of claim 12, wherein providing the reset voltage pulse comprises producing a reset voltage across an electrolyte solution disposed between a first electrode electrically connected to the source or the drain of the TFT and a second electrode of the pixel, wherein the second electrode is electrically connected to other pixels adjacent to the pixel.

16. The method of claim 15, wherein the TFT is located in a first support plate and the second electrode is located in a second support plate, and wherein the electrolyte solution is disposed between the first support plate and the second support plate.

17. The method of claim 12, wherein the reset voltage pulse comprises a square pulse having a width in a range of about 0.5 milliseconds to about 2.0 milliseconds.

18. The method of claim 12, wherein the reset voltage pulse comprises a square pulse having a width less than 1.0 milliseconds.

19. The method of claim 12, further comprising:
before the applying the reset voltage pulse, applying a drive voltage with a value that drives the pixel to a fully-open state.

* * * * *